(12) United States Patent
Fisher

(10) Patent No.: US 9,412,287 B2
(45) Date of Patent: Aug. 9, 2016

(54) TRAFFIC ADVISOR FOR EMERGENCY VEHICLES

(71) Applicant: Halcore Group, Inc., Grove City, OH (US)

(72) Inventor: Eric Fisher, Columbus, OH (US)

(73) Assignee: Halcore Group, Inc., Grove City, OH (US)

( * ) Notice: Subject to any disclaimer, the term of this patent is extended or adjusted under 35 U.S.C. 154(b) by 16 days.

(21) Appl. No.: 14/285,413

(22) Filed: May 22, 2014

(65) Prior Publication Data

US 2015/0310781 A1 Oct. 29, 2015

Related U.S. Application Data

(60) Provisional application No. 61/983,158, filed on Apr. 23, 2014.

(51) Int. Cl.
| | | |
|---|---|---|
| *G09F 21/04* | (2006.01) | |
| *G09F 7/20* | (2006.01) | |
| G09F 7/18 | (2006.01) | |
| B60Q 1/26 | (2006.01) | |

(52) U.S. Cl.
CPC ...... *G09F 21/04* (2013.01); *G09F 7/20* (2013.01); *B60Q 1/2611* (2013.01); *G09F 2007/1865* (2013.01)

(58) Field of Classification Search
CPC ............... B60Q 1/2611; G09F 2007/1865
USPC ............................... 296/19; 40/592
See application file for complete search history.

(56) References Cited

U.S. PATENT DOCUMENTS

| | | | |
|---|---|---|---|
| 3,761,890 A | 9/1973 | Fritts et al. | |
| 4,259,660 A * | 3/1981 | Oliver ............. | B60Q 1/2611 116/40 |
| 4,662,095 A | 5/1987 | Higgins | |
| 5,010,319 A | 4/1991 | Killinger | |
| 5,433,026 A * | 7/1995 | McDermott et al. ........ | 40/592 |
| 5,438,780 A | 8/1995 | Winner | |
| 5,560,702 A * | 10/1996 | Gold .......................... | 362/496 |
| 5,791,077 A * | 8/1998 | Felber ......................... | 40/610 |
| 6,184,786 B1 * | 2/2001 | Medeiros .................... | 340/463 |
| 7,825,790 B2 | 11/2010 | Tallinger | |
| 2007/0197084 A1 * | 8/2007 | Darolfi et al. ............. | 439/470 |
| 2011/0221589 A1 * | 9/2011 | LeBeau et al. ............ | 340/468 |
| 2014/0340214 A1 * | 11/2014 | McLoughlin et al. ..... | 340/472 |

FOREIGN PATENT DOCUMENTS

EP 2549463 1/2013

* cited by examiner

*Primary Examiner* — Kristina Junge
(74) *Attorney, Agent, or Firm* — Hovey Williams LLP

(57) ABSTRACT

A traffic advisor for an emergency vehicle. The traffic advisor includes a base capable of being attached to a roof of an emergency vehicle. The traffic advisor additionally includes a display member coupled to the base and shiftable relative to the base between a stowed position and a deployed position. The display member is further configured to display one or more advisory messages. The traffic advisor may also include an actuation system for shifting the display member between the stowed position and the deployed position. As such, in the deployed position, the traffic advisor is operable to display advisory messages that are clearly viewable from a position rearward of the emergency vehicle.

18 Claims, 11 Drawing Sheets

TRAFFIC ADVISOR FOR EMERGENCY VEHICLES

CROSS-REFERENCE TO RELATED APPLICATIONS

The present application claims the priority benefit of U.S. Provisional Patent Application Ser. No. 61/983,158, filed Apr. 23, 2014, entitled "TRAFFIC ADVISOR FOR EMERGENCY VEHICLE," which is incorporated by reference in its entirety herein.

BACKGROUND

1. Field of the Invention

Embodiments of the present invention are directed to a traffic advisor for an emergency vehicle. More particularly, embodiments of the present invention are directed to a traffic advisor positioned on a roof of an emergency vehicle, with such traffic advisor including a display capable of shifting between a stowed position and a deployed position.

2. Description of the Related Art

Emergency vehicles such as ambulances, fire trucks, and police cars often include emergency signaling systems mounted thereon. Typically, these systems include emergency signaling lights that may flash in various colors and patterns. Such systems enable emergency services personnel, including emergency medical technicians ("EMT"s), firefighters, or police officers, to provide alerts or instructions to persons in the vicinity of the emergency vehicles. However, such emergency signaling systems general comprise only flashing-type signaling lights that are appropriate for providing alerts, bur are not capable of providing specific advisements and/or instructions to persons in the vicinity of the emergency vehicles.

Furthermore, and especially for ambulance-type emergency vehicles, such emergency signaling systems are generally mounted on the emergency vehicles' sides. As such, the emergency signaling systems are capable of providing alerts to persons facing the sides of the emergency vehicles. However, in the case of ambulances, the back sides of ambulances are generally configured to include large doors that provide access to the interior of the ambulances. When such doors are opened, the doors will cover nearly the entire back side of the ambulance. As such, the doors will block the signaling lights positioned on the back side of the ambulance. Thus, in certain situations, emergency signaling systems on ambulances can be ineffective at providing alerts, advisements, and/or instructions to persons facing the back side of the ambulance.

Accordingly, there is a need for a traffic advisor for an emergency vehicle that is capable of selectively providing specific alerts, advisements, and/or instructions as required by the emergency services personnel operating the emergency vehicle. Additionally, there is a need for a traffic advisor that is capable of providing alerts, advisements, and/or instructions from a back side of an emergency vehicle even when the vehicle's back side lights are obstructed or otherwise nonfunctional.

SUMMARY

Embodiments of the present invention solve the above-mentioned problems by providing a traffic advisor for an emergency vehicle. The traffic advisor comprises a base configured for attachment to a roof of the emergency vehicle, with the base including a bottom plate having top and bottom surfaces and a rim extending up from and extending around a circumference of the top surface of the bottom plate. The traffic advisor additionally includes a display member coupled to the base and shiftable relative to the base between a stowed position and a deployed position, and with the display member being configured to display one or more advisory messages. The traffic advisor further includes an actuation system for shifting the display member between the stowed position and the deployed position. As such, in the deployed position, the display member presents a forward-facing side and a rearward-facing side. Furthermore, the display member has a thickness that corresponds to a height of the rim of the base, such that, in the stowed position, the rearward-facing side of the display member is positioned adjacent to the bottom plate of the base and the forward-facing side is substantially flush with a top portion of the rim of the base.

Embodiments of the present invention additionally provide for an emergency vehicle broadly comprising: a cab, a patient compartment having a roof and one or more rear access doors positioned on a rear side of the patient compartment, and a traffic advisor including a display member coupled to the roof and shiftable between a stowed position where the display member is substantially parallel to the roof and a deployed position where the display member extends upwardly from the roof. Furthermore, the display member may be positioned on the roof at a location that is spaced less than 12 inches forward of the rear side of the patient compartment.

Further embodiments of the present invention include a method for operating an emergency vehicle having a traffic advisor operable to display one or more advisory messages, with the traffic advisor being positioned on a roof of the emergency vehicle. The method includes the initial step of navigating the emergency vehicle, with the traffic advisor being in a stowed position. A next step includes, activating emergency indicators positioned on a rear side of the emergency vehicle. A next step includes, opening at least one rear door of the emergency vehicle to provide access to an interior of the emergency vehicle. When the rear door is open, the rear door obstructs at least one of the emergency indicators positioned on the rear side of the emergency vehicle. A next step includes, shifting the traffic advisor from the stowed position to a deployed position. After shifting the traffic advisor, an advisory message is selected to be displayed via the traffic advisor. As such, the advisory message is unobstructed even when the rear door is open. A final step includes shifting the traffic advisor from the deployed position to the stowed position.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWINGS

Embodiments of the invention are described in detail below with reference to the attached drawing figures, wherein.

Figure 1:
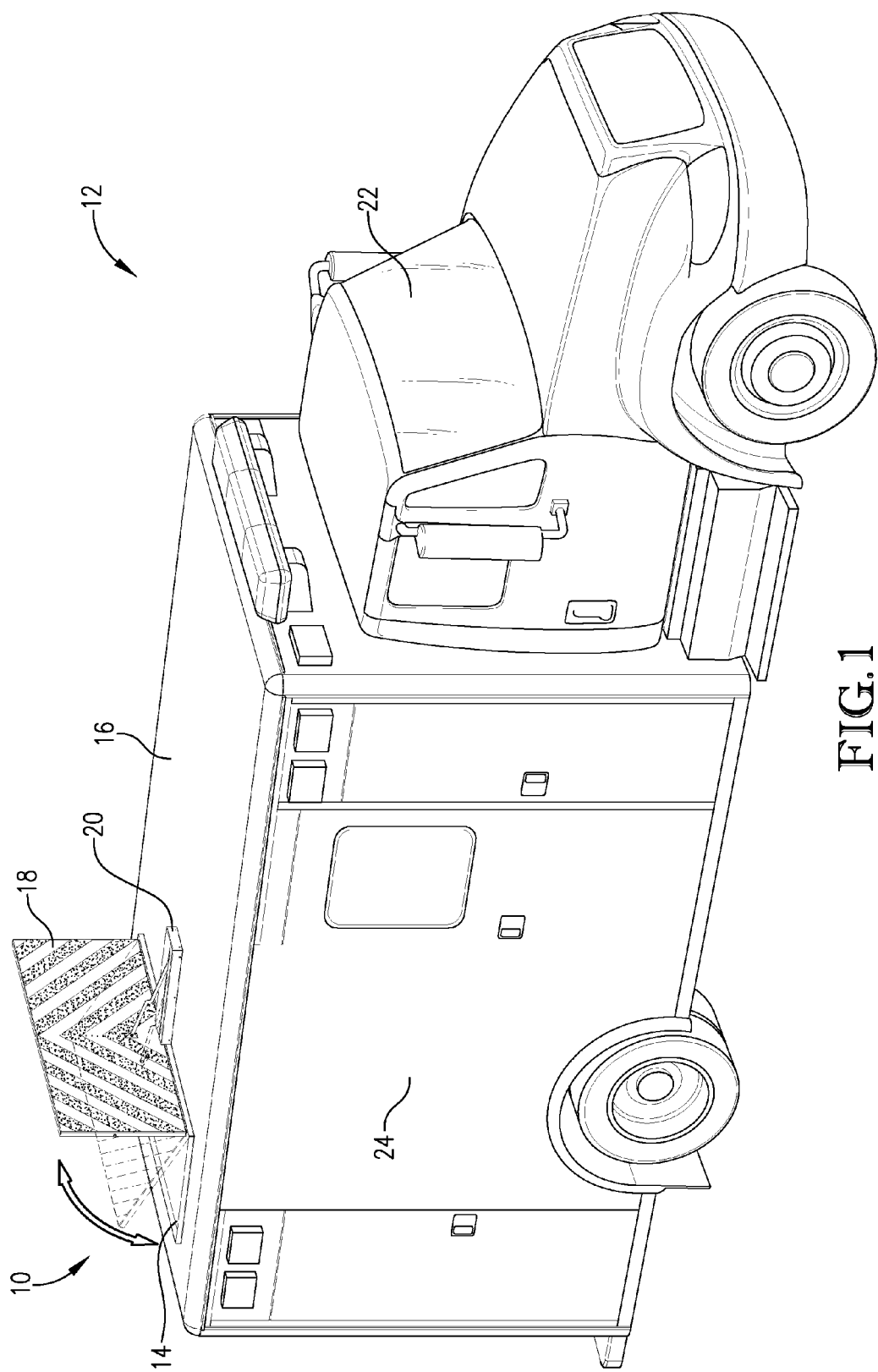
FIG. 1 is a front right perspective view of an emergency vehicle with a traffic advisor positioned on a roof of its patient compartment according to embodiments of the present invention, and with the traffic advisor is illustrated being shiftable between stowed and deployed positions.

The drawing figures do not limit the invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 2:
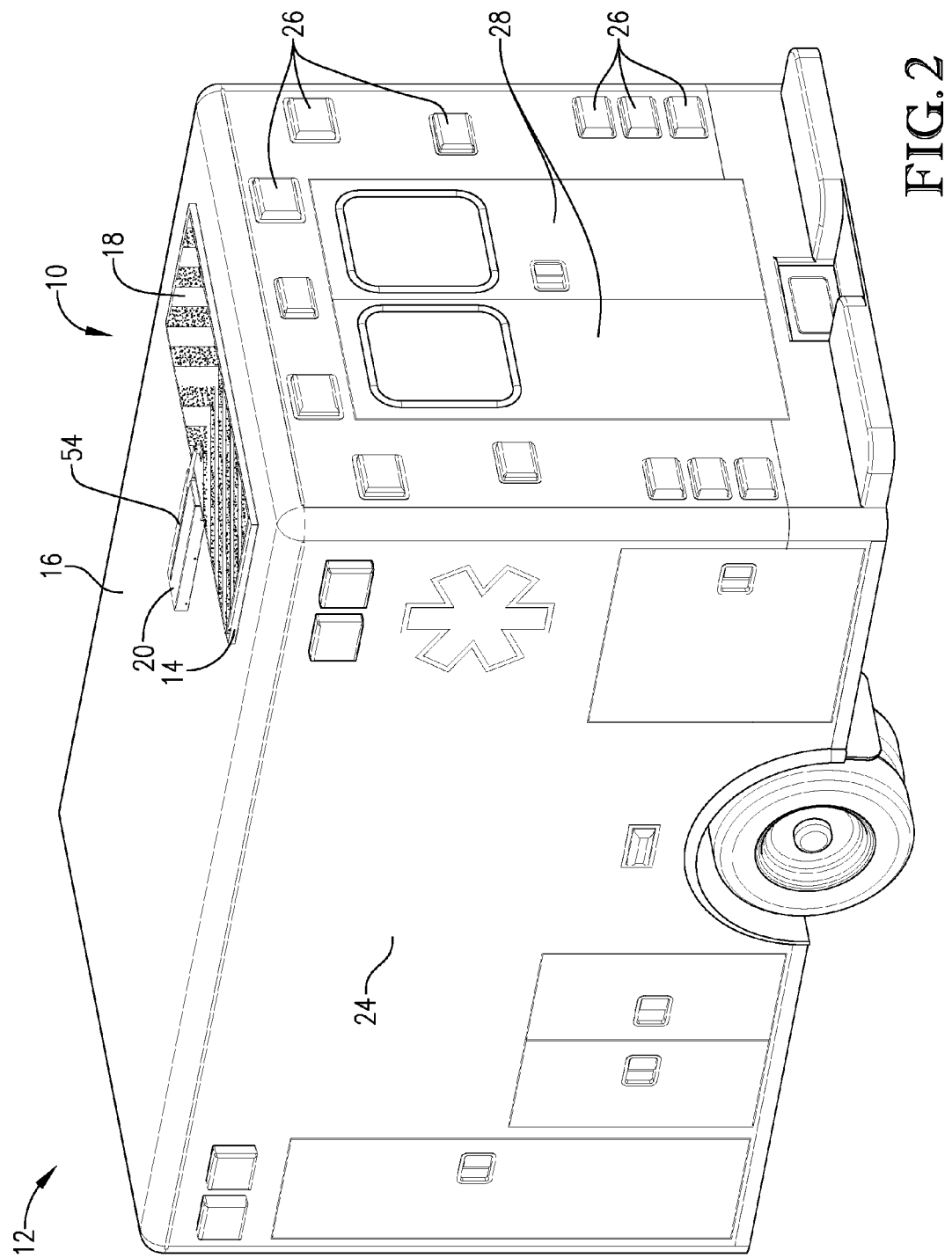
FIG. 2 is a left rear perspective view of a patient compartment of an emergency vehicle with the traffic advisor from FIG. 1 positioned on the roof, with the traffic advisor in a stowed position.
Figure 3:
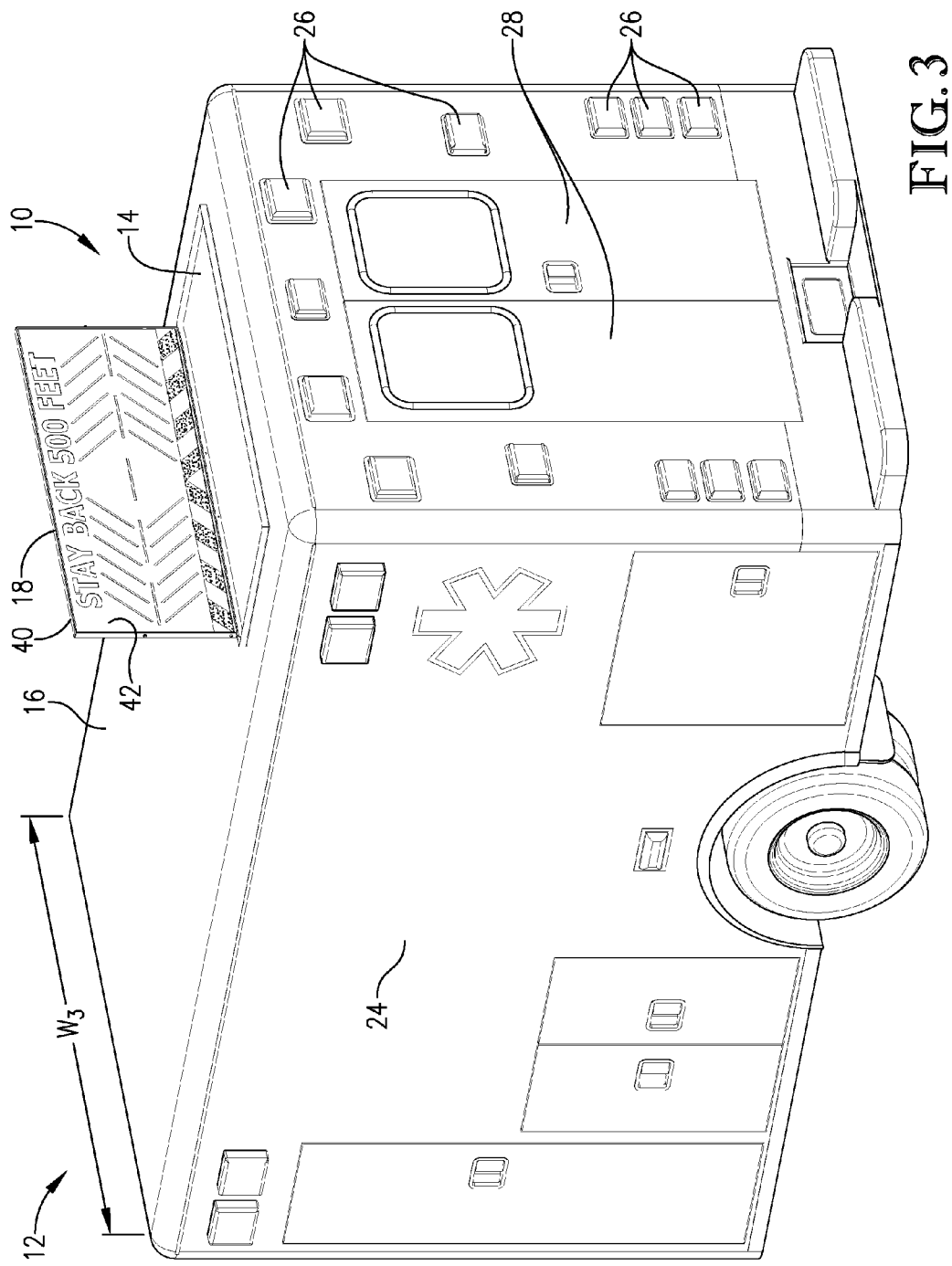
FIG. 3 is a left rear perspective view of the patient compartment of the emergency vehicle from FIG. 2, with the vehicle including the traffic advisor from FIGS. 1-2 positioned on the roof, with the traffic advisor in a deployed position.

As illustrated in FIGS. 1-3, embodiments of the present invention include a traffic advisor 10 for an emergency vehicle 12. The traffic advisor 10 of embodiments of the present invention includes a base a base 14 configured for attachment to a roof 16 of the emergency vehicle 12, a display member 18 coupled to the base 14 and shiftable relative to the base 14 between a stowed position and a deployed position, with the display member 18 being configured to display one or more advisory messages, and an actuation system 20 for automatically shifting the display member 18 between the stowed position and the deployed position. As illustrated in FIG. 3, embodiments of the present invention provide for the traffic advisor 10 to have a thin profile with respect to the roof 16 of the emergency vehicle 12, such that, in some embodiments, no portion of the display member 18 will extend more than 3 inches above the roof 16 of the emergency vehicle 12 when the display member 18 is in the stowed position. Contrastingly, when the display member 18 is in the deployed position, such as illustrated in FIGS. 1-2, at least a portion of the display member 18 will extends at least 12 inches above the roof 16 of the emergency vehicle 12. As such, embodiments of the present invention provide for a traffic advisor 10 that is capable of having a low-profile configuration while in a stowed position, and also capable of having a prominently observable configuration when in a deployed position. As such, the traffic advisor 10 is configured to display advisory messages, such as alerts, advisements, and/or instructions, which can be viewed from a rear side of the emergency vehicle 12 at all times, even while doors on the back side of the emergency vehicle 12 are in an open position.

As referred to herein, the term emergency vehicle 12 broadly includes to vehicles used by emergency response personnel, such as ambulances, fire trucks, patrol cars, and any other vehicle that may be equipped with emergency indicators, such as lights and/or sirens. Nevertheless, the detailed description provided herein and the illustrations provided for in the figures are directed to embodiments in which the emergency vehicle 12 is an ambulance. As illustrated in FIG. 1, such an ambulance may include a cab 22 that houses the ambulance's power train and driver's compartment. Additionally, the ambulance may include a patient compartment 24 for transporting and providing medical services to patients. As illustrated in FIGS. 2-3, such a patient compartment 24 will generally include one or more main emergency indicators 26 (e.g., lights and/or sirens) and one or more rear doors 28 positioned on a rear side of the patient compartment 24.

Furthermore, as referred to herein and as will be described in more detail below, the term "stowed position" refers to a position in which a substantial portion of the display member 18 is received within the base 14 (e.g., FIG. 2), while the term "deployed position" refers to a position in which a substantial portion of the display member 18 is not received within the base 14 (e.g., FIG. 3). Finally, the terms: "right" referrers to a position toward a right side of the emergency vehicle 12, otherwise known as a passenger's side of the emergency vehicle 12; "left" referrers to a position toward a left side of the vehicle, otherwise known as a driver's side of the emergency vehicle 12; "forward" or "front" refers to a position toward a front of the emergency vehicle 12; and "rearward" or "back" refers to a position toward the back of the emergency vehicle 12. When such directional terminologies are used with respect to the traffic advisor 10, such terms are defined with respect to the traffic advisor 10 being positioned on the emergency vehicle 12, such as illustrated in FIGS. 1-3.

Embodiments of the present invention provide for components of the traffic advisor 10 to be constructed from various types of materials. Nonetheless, in certain embodiments, the traffic advisor 10 is preferredly constructed from strong, light-weight materials that can withstand high-winds and travel speeds, but yet light enough so as to not add significant weight to the emergency vehicle 12. As such, some embodiments provide for the traffic advisor 10 to be constructed from aluminum, carbon fiber, or the like.

Figure 4:
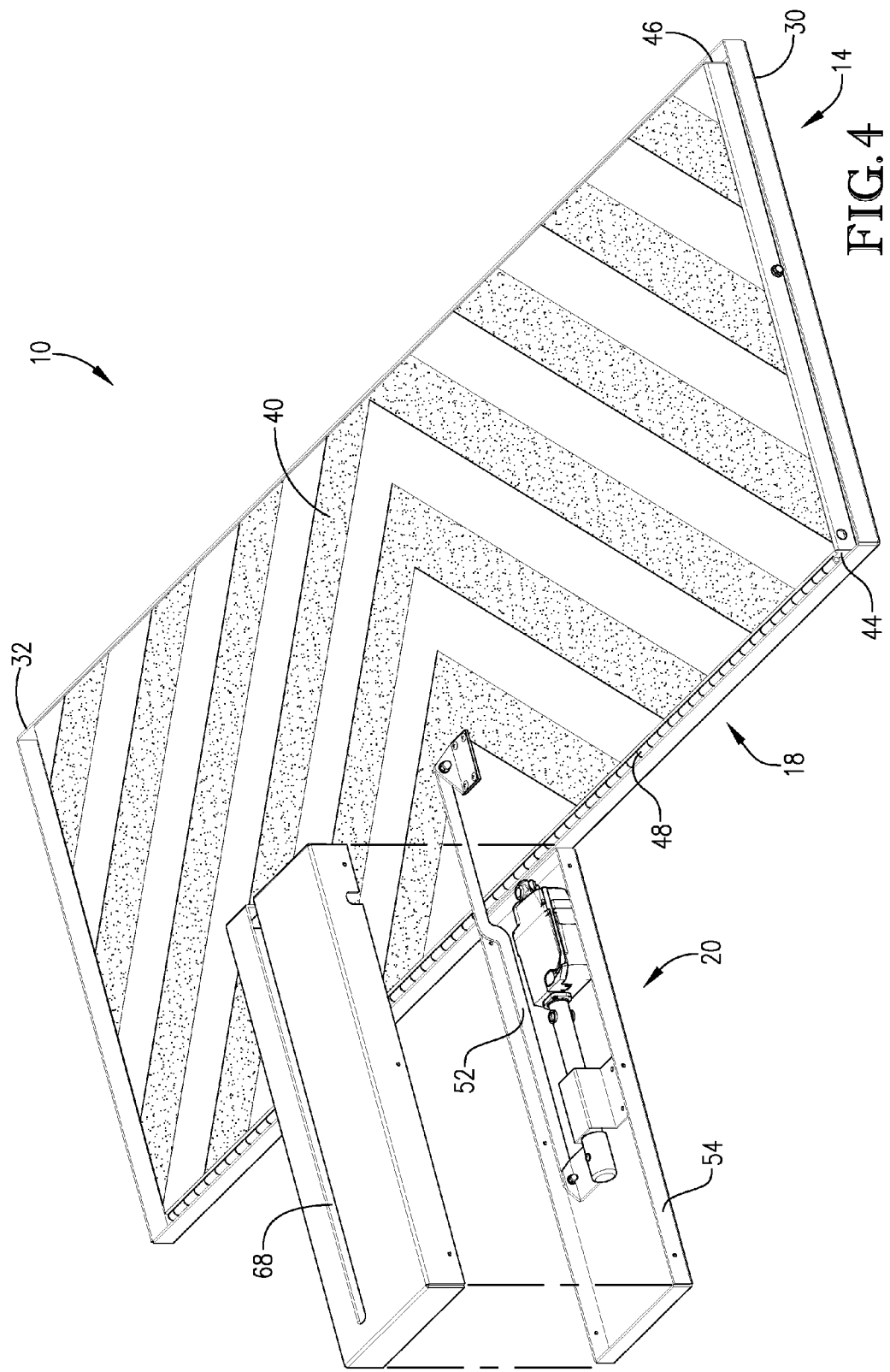
FIG. 4 is a forward perspective view of the traffic advisor from FIGS. 1-3, with the traffic advisor in the stowed position, and with an actuator housing of the traffic advisor shown partially exploded to illustrate an actuation system of the traffic advisor.
Figure 5:
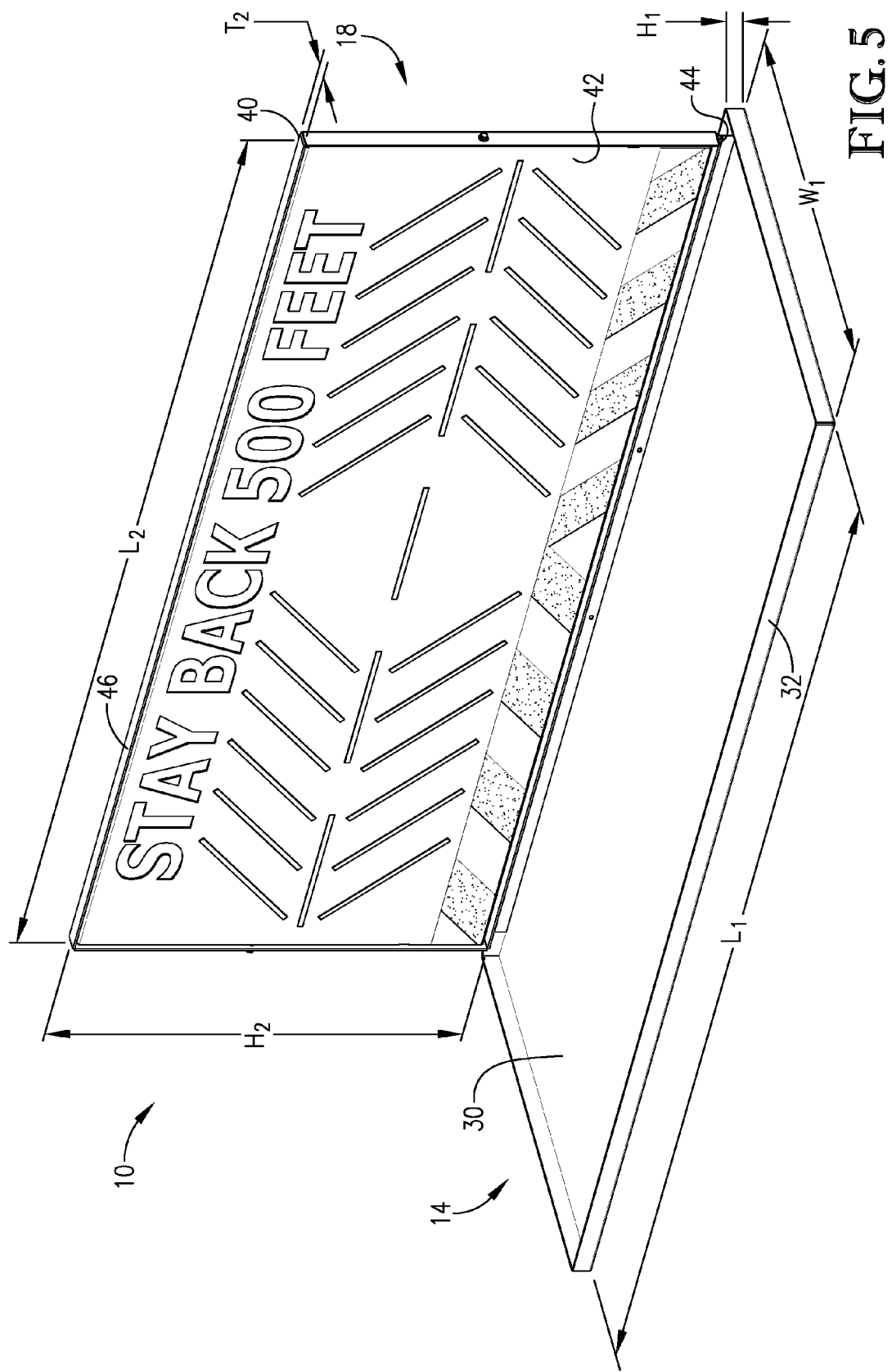
FIG. 5 is a rearward perspective view of the traffic advisor from FIGS. 1-4, with the traffic advisor in the deployed position.

As illustrated in FIGS. 4-5, the base 14 of the traffic advisor 10 comprises a generally rectangular bottom plate 30 with top and bottom surfaces. The base 14 includes a rim 32 extending up from the top surface of the bottom plate 30 and extending around a perimeter of the bottom plate 30. As such, the bottom plate 30 and the rim 32 present a recess within which the display member 18 is received while in the stowed position (e.g., FIG. 4). In certain embodiments, as illustrated in FIG. 5, the base 14 will include a length L1 between 24 and 120 inches, between 48 and 108, between 60 and 84 inches, or 69 inches. As used herein, the term length generally refers to a longest side of a component. Additionally, the base 14 may include a width W1 of between 12 and 42 inches, between 18 and 35 inches, between 25 and 28 inches, or 26 inches. Furthermore, the base 14 may include a height H1 of between 0.5 and 6 inches, between 0.75 and 4 inches, between 1.0 and 3 inches, or 1.1 inches. As such, the base 14 is configured to be secured to the roof 16 of the emergency vehicle 12, as illustrated in FIGS. 1-3, such that the bottom surface of the base 14 is adjacent to the roof 16. In some embodiments, the base 14 may be secured to the roof 16 via welding, riveting, or other standard methods of fastening, such as nut and bolt combinations. In certain embodiments the base 14 may be secured to the roof 16 at a location that is between 3 to 18 inches, between 6 to 15 inches, or between 9 and 12 inches from the rear side of the emergency vehicle 12.

The display member 18 of the traffic advisor 10 is generally rectangular and includes a forward-facing side 40 and a rearward-facing side 42. As used herein, the forward-facing side of the display member 18 generally faces the front of the emergency vehicle 12 when the display member 18 is in the deployed position, and the rearward-facing side 42 generally faces the rear of the emergency vehicle 12 when in the deployed position. Furthermore, the display member 18 will include a bottom edge 44 and top edge 46. As best illustrated by FIG. 4, embodiments of the present invention provide for the display member 18 to be hingedly coupled to the base 14 via a hinge member 48 that extends along the display member's 18 bottom edge 44. The hinged member 48 may connect to the base 14 on the bottom plate 30 or, alternative, on the rim 32. As such, the display member 18 is capable of shifting from the stowed position to the deployed position by rotating about the hinged member 48.

In certain embodiments, the display member 18 may have dimensions that are slightly smaller than dimensions of the base 14, such that the display member can be completely received within the recess of the base 14 while in the stowed position. For clarity, the following dimensions are described with reference to the display member 18 being in the deployed position (e.g., FIG. 5). As such, the display member 18 may include a length L2 between 20 and 110 inches, between 40 and 90, between 55 and 70 inches, or 65 inches. Additionally, the display member 18 may include a height H2 of between 10 and 40 inches, between 16 and 32 inches, between 23 and 26 inches, or 25 inches. Furthermore, the base 14 may include a thickness T2 of between 0.3 and 5 inches, between 0.5 and 3.5 inches, between 0.75 and 2 inches, or 1 inch. As such, the rearward-facing side 42 of the display member may present a surface area (i.e., L2×H2) of at least 4, 6, 8, 10, or 12 square feet. Given the above-provided dimensions, the display member 18 may be received within the recess of the base 14 when the display member 18 is in the stowed position. In particular, as illustrated by FIGS. 4 and 5, the thickness T2 of the display member 18 generally corresponds to a height of the rim 32 of the base 14, such that, in the stowed position, the rearward-facing side 42 of the display member 18 is positioned adjacent to the bottom plate 30 of the base 14, and the forward-facing side 40 is substantially flush with a top portion of the rim 32 of the base 14.

In some embodiments, as illustrated in FIG. 3, the patient compartment 24 of the emergency vehicle 12 will have a width W3 of between 75 and 110 inches, between 85 and 100 inches, or 96 inches. Given the above described dimensions of the base 14 and the display member 18, the traffic advisor 10 will generally have a length (e.g., the length L1 of the base 14) that is smaller than the width W3 of the emergency vehicle's 12 patient compartment 24. In some embodiments, a ratio of the length of the traffic advisor 10 to the width W3 of the emergency vehicle's 12 patient compartment 24 will be at least 1:2, at least 2:3, at least 3:4, or at least 5:6.

As best shown by FIG. 4, the forward-facing side 40 of the display member 18 may include one more symbols, messages, and/or illustrations that can be observed from the front of the emergency vehicle 12. For example, such symbols may include alternating colored chevrons meant to indicate caution, alert, or warning. As shown in FIG. 5, the rearward-facing side 42 of the display member comprises an illumination system for displaying one or more advisory messages. The illumination system may comprise a plurality of multi-colored electrical lights, such as bulbs, LEDs, strobe-lights, or the like. For example, in certain embodiments, the illumination system may comprise a plurality of flushly-mounted LEDs that are capable of illustrating various advisory messages, in the form of text or symbols. Such advisory messages may include left and right arrows. However, in other embodiments, the advisory messages may include instructional messages and alerts provided in various languages, and intended to provide persons facing a rear of the emergency vehicle 12 with alerts, advisements, and/or instructions. For example, the advisory messages may include a message indicating the persons should "STAY BACK." In some embodiments, the advisory message may include a distance that persons should "STAY BACK." For example, the distance may include at least 100, 250, 400, or 450 feet, and/or not more than 1,000, 750, 600, or 550 feet. The functionality of the advisory messages will be described in more detail below.

Figure 6:
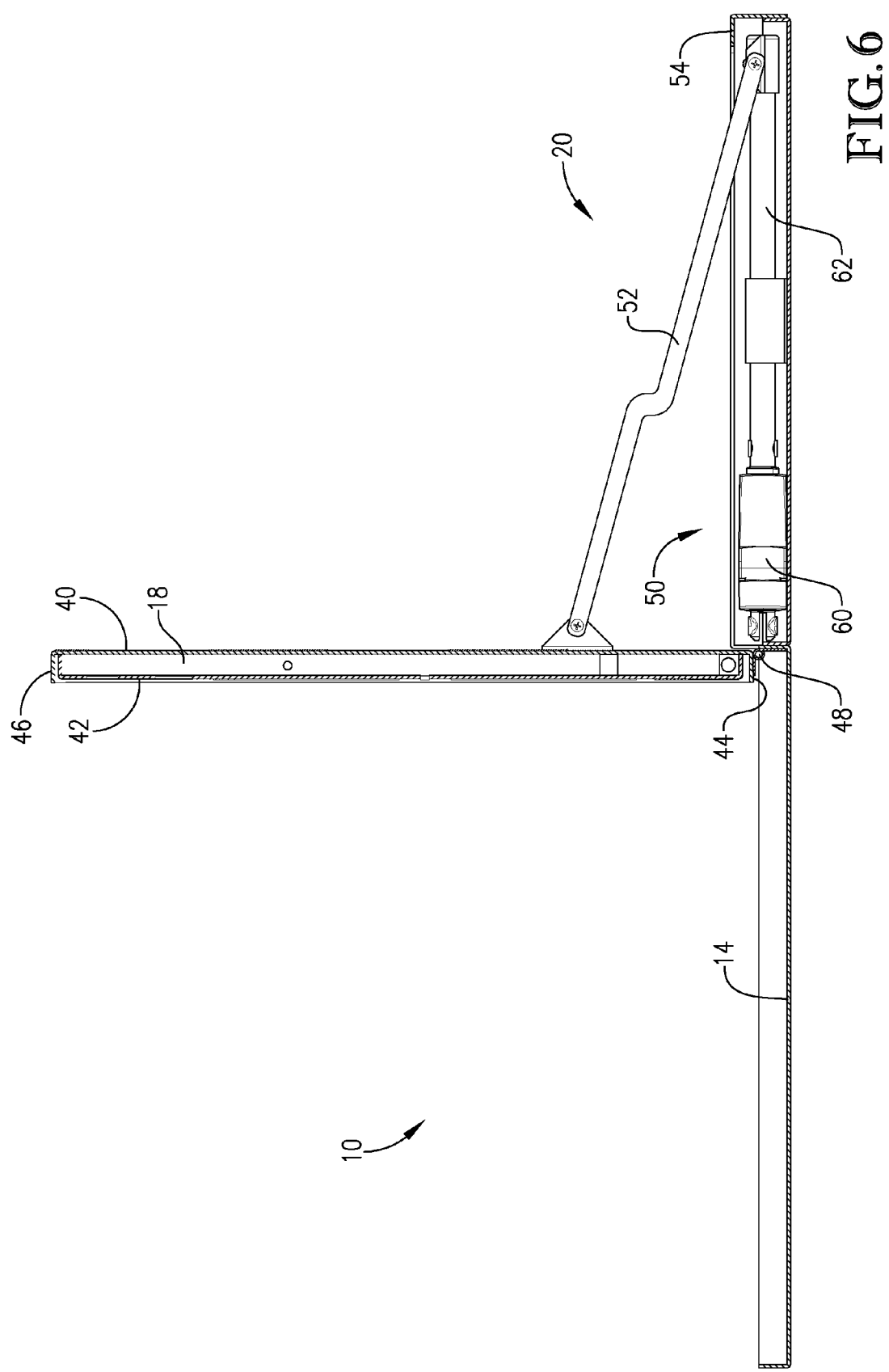
FIG. 6 is a left side elevational cross-section view of the traffic advisor from FIGS. 1-5, with the traffic advisor in the deployed position.
Figure 7:
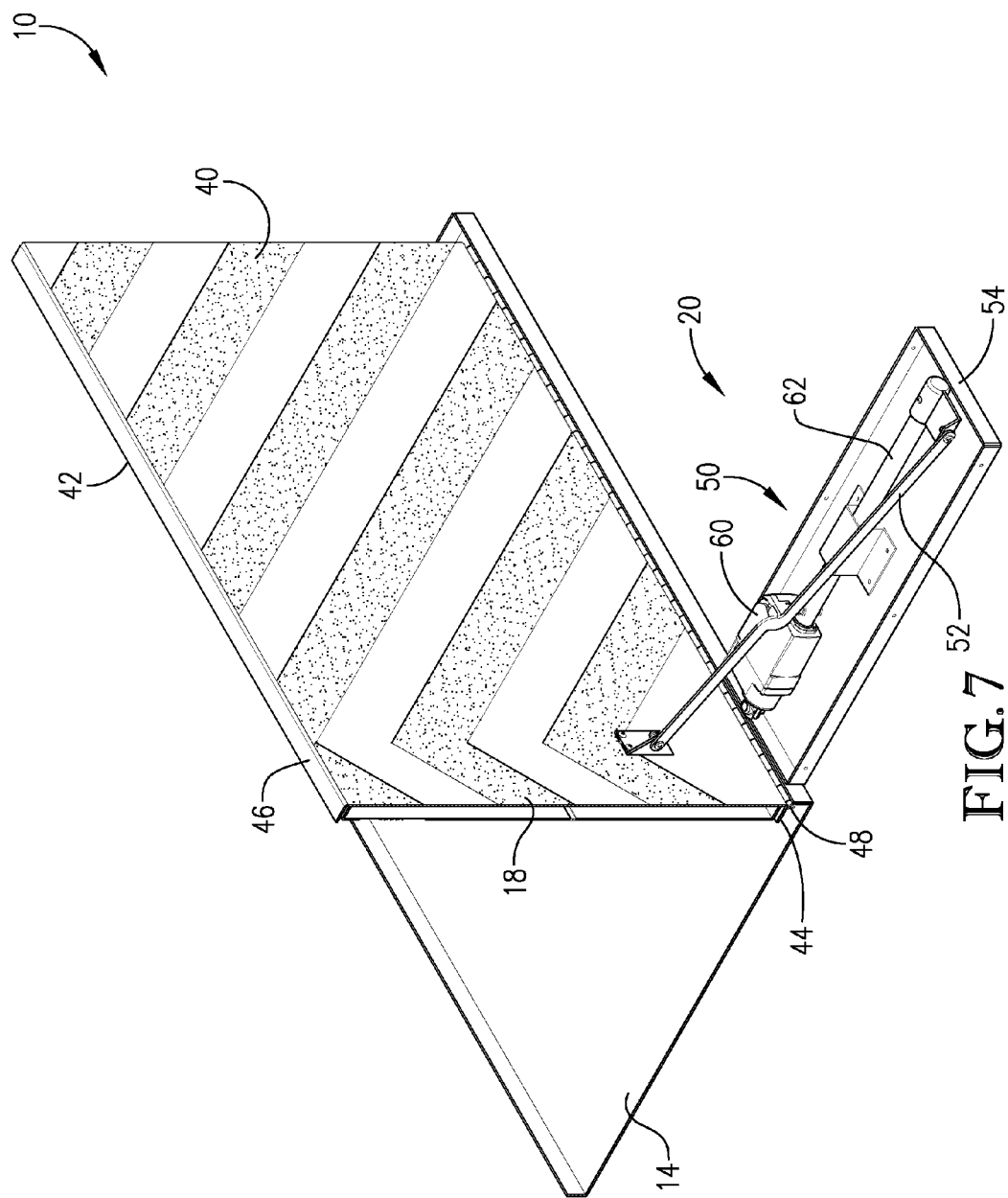
FIG. 7 is a cross-section view of the traffic advisor from FIGS. 1-6, with a top portion of the actuator housing removed to illustrate the actuator system of the traffic advisor, and with the traffic advisor in the deployed position.
Figure 8:
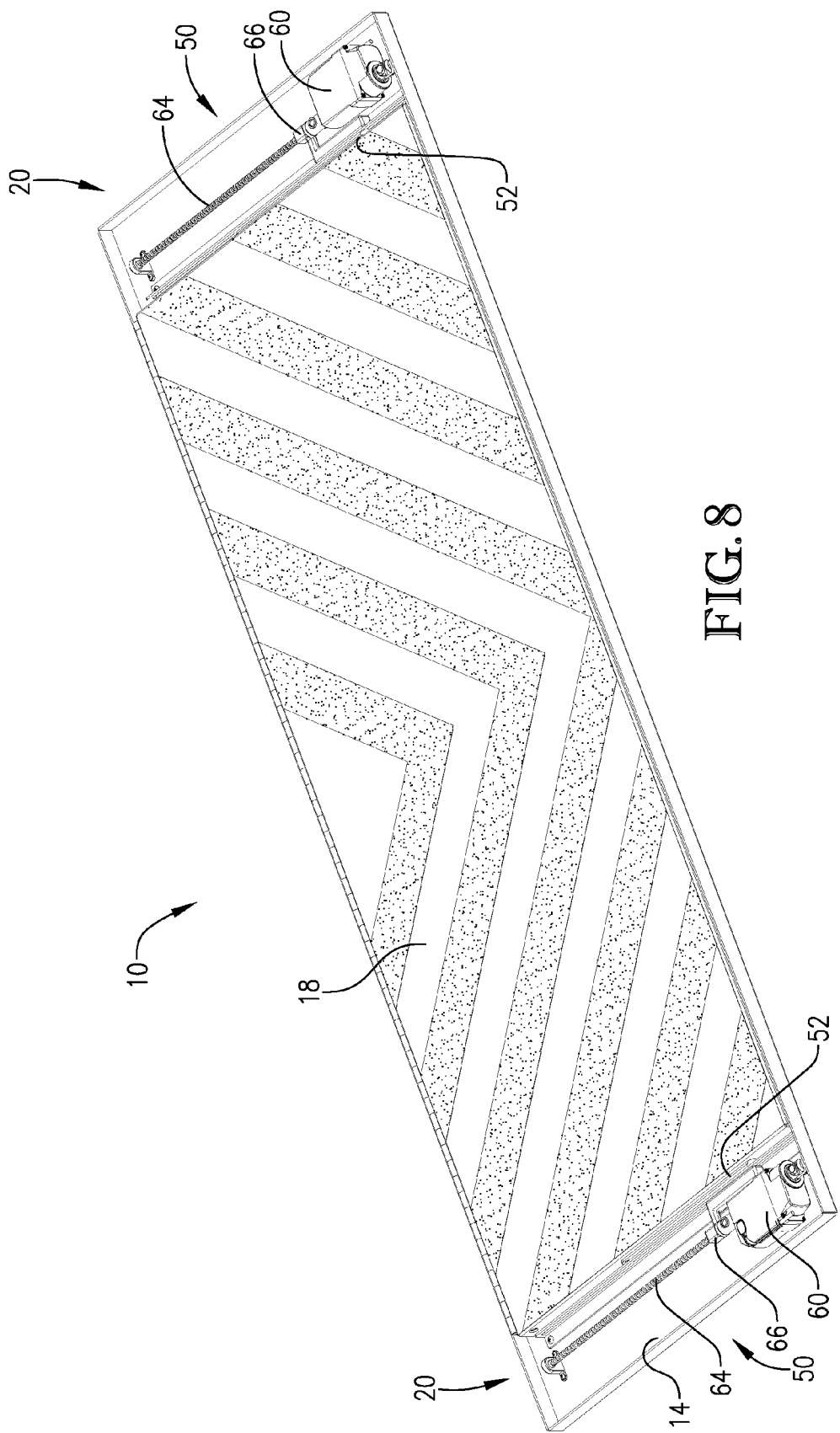
FIG. 8 is a perspective view of an additional embodiment of a traffic advisor, with the traffic advisor in a stowed position.
Figure 9:
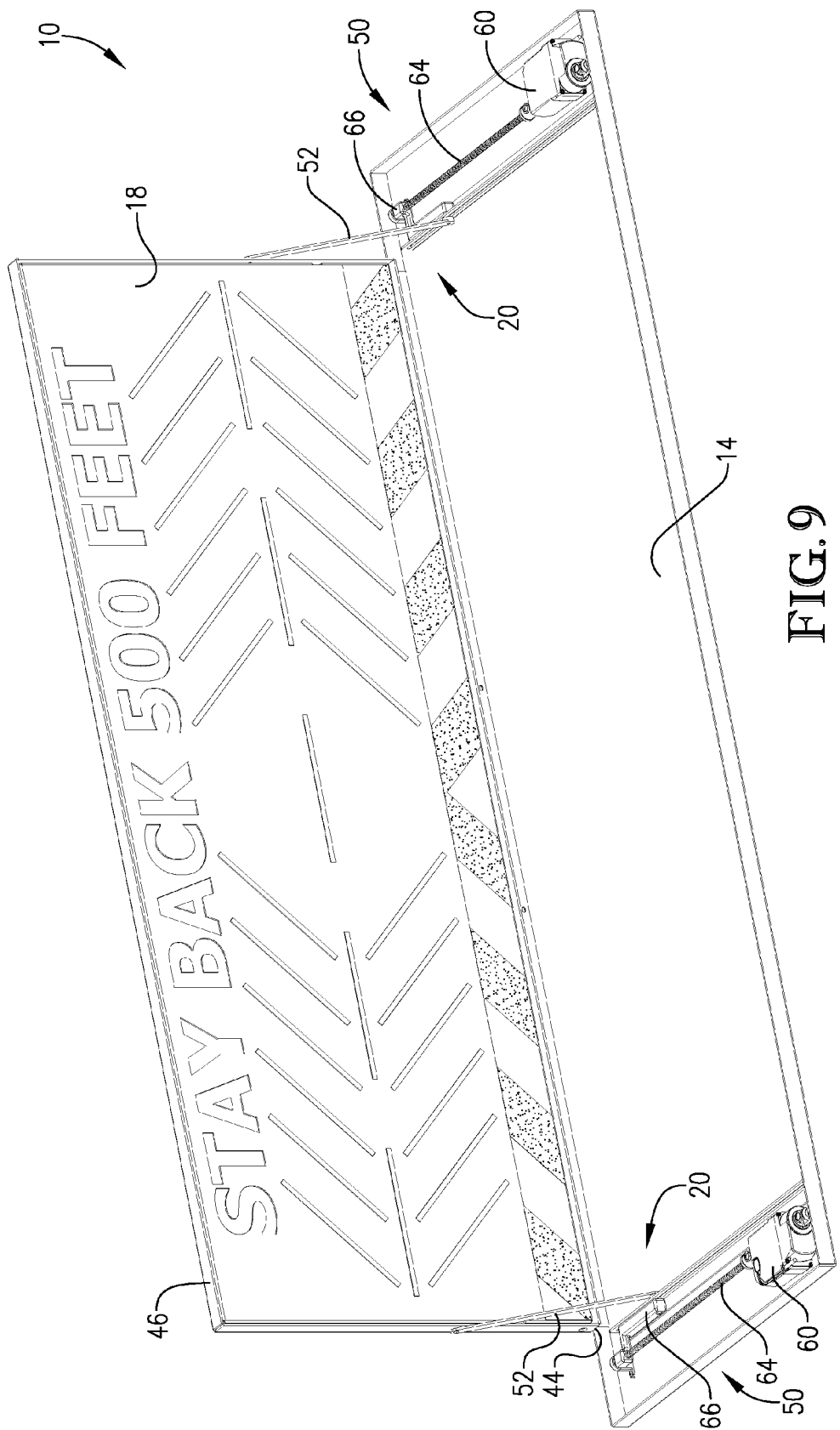
FIG. 9 is a perspective view of the traffic advisor from FIG. 8, with the traffic advisor in a deployed position.

As illustrated in FIGS. 6-7, the actuation system 20 of the traffic advisor 10 will include one or more linear actuators 50, each coupled to the display member 18 via an elongated support member 52 having proximal and distal ends. In certain embodiments, the linear actuator 50 will be positioned within an actuator housing 54 positioned adjacent but external to the base 14. For example, as illustrated in FIG. 2, the linear actuator 50 is housed within the actuator housing 54 that is positioned forward of the base 14 and the display member 18 (i.e., between a front of the emergency vehicle 12 and the base 14). In other embodiments, such as illustrated in the linear actuator 50 may be positioned within the recess of the base 14, adjacent to display member 18 when in a stowed position. For example, as illustrated in FIGS. 8-9, the traffic advisor 10 may include two linear actuators 50 positioned within the recess of the base 14 on either side of the display member 18 in the stowed position. Regardless, of the number or positions of the linear actuators 50, such actuators 50 general comprise either an electric motor 60 operable to extend and retract (via internal gears and spindles) a generally solid rod 62 associated with the motor 60 (e.g., FIGS. 6-7), or an electric motor 60 operable to rotate a threaded shaft 64 associated with the motor 60 (e.g., FIGS. 8-9). Regardless of whether the solid rod 62 or the threaded shaft 64 is used, each will include a proximal end coupled with the motor 60 and a distal end positioned away from the motor 60.

For embodiments that include the solid rod 62, such as illustrated in FIGS. 6-7, the proximal end of the elongated support member 52 will be pivotally connected to the distal end of the solid rod 62, while the support member's 52 distal end is connected to the display member 18. As such, when the motor 60 actuates the solid rod 62, the support member 52 is correspondingly caused to extend or retract. The extension and retraction of the support member 52 causes the display member 18 to shift between the stowed and deployed position, and vice-a-versa.

For embodiments that include the threaded shaft 64, such as illustrated in FIGS. 8-9, the actuation system 20 may additionally include an internally threaded component 66, such as a sleeve or a nut that is operable to translate about the threaded shaft 64 as the shaft 64 is rotated by the motor 60. The elongated support member 52 is pivotally connected to the threaded component 66 at the support member's 52 proximal end, while support member's 52 distal end is connected to the display member 18. As such, when the motor 60 rotates the threaded shaft 64, the threaded component 66 translates about the shaft 64, thereby causing the proximal end of the support member 52 to extend or retract along the threaded shaft 64. The extension and retraction of the support member (s) 64 causes the display member 18 to shift between the stowed and deployed position, and vice-a-versa.

As an illustration of embodiments of an actuator system 20 incorporating use of a solid rod 62 (i.e., FIGS. 6-7), the traffic advisor 10 may include a single support member 52 with a distal end of the support member 52 attached to the forward-facing side 40 of the display member 18. As previously described, the linear actuator 50 may be housed within the actuator housing 54. Furthermore, the actuator housing 54 may include a longitudinal opening or slot 68 (as best seen in FIG. 4) through which the support member 52 can pass while translating via actuation of the solid bar 62. The support member 52 may be connected to the display member 18 via a bracket or the like. As illustrated in FIG. 6, in some embodiments, the support member 52 is connected to the display member 18 at a position spaced apart from the bottom edge 44 of the display member 18 by at least 4 inches, 8 inches, or 12 inches, or alternatively, spaced apart from the top edge 46 of the display member by at least 4 inches, 8 inches, or 12 inches.

When the display member 18 is in the stowed position (e.g., FIG. 4), the support member 52 is in a retracted position, with its proximal end positioned away from the motor 60. To shift the display member 18 to the deployed position (e.g., FIGS. 6 and 7), the motor 60 causes the solid rod 62 to actuate away from the motor 60, thus, causing the proximal end of the support member 52 to translate forward, away from the motor 60. Such a forward translation pulls the display member 18 up from its stowed position to its deployed position. A reverse process is followed to shift the display member 18 from its deployed position to its stowed position.

As illustrated in FIGS. 2 and 4, while in the stowed position, certain embodiments provide for the display member 18 to be generally parallel with the bottom plate 30 of the base 14 and with the roof 16 of the emergency vehicle 12. While in the deployed position, as illustrated in FIGS. 1, 3, and 5, certain embodiments provide for the display member 18 to be generally perpendicular with the bottom plate 30 of the base 14 and with the roof 16 of the emergency vehicle 12. However, in other embodiments, the display member 18 may be orientated at different angles in its stowed and deployed positions. For example, in some embodiments, the orientation of the display member 18 in the deployed position may be at least 60, 75, or 85 degrees and/or not more than 120, 105, or 95 degrees different than the orientation of the display member 18 in the stowed position.

Correspondingly, as illustrated in FIGS. 2 and 4, while the display member 18 is in the stowed position, certain embodiments provide for the support member 52 to be extended generally parallel with the display member 18. Alternatively, with the display member 18 in the deployed position, as illustrated in FIGS. 1, 3, and 5, certain embodiments provide for the support member 52 to be retracted and angled relative to the display member 18. In such embodiments, the support member 52 may form an angle of extension with respect to the display member 18 that is at least 15, 30, or 40 degrees and/or not more than 75, 60, or 50 degrees. As such, and with respect to the embodiment illustrated in FIGS. 4 and 5 with a single support member 52, while the support member 52 is in an extended position (i.e., its proximal end away from the motor 60), the display member 18 is in the deployed position, and while the support member 52 is in a retracted position (i.e., its proximal end closer to the motor 60), the display member 18 is in the stowed position.

Embodiments of the present invention additionally provide for the traffic advisor 10 to include more than one support member 52. In particular, and with reference to FIGS. 8-9, embodiments may provide for the traffic advisor 10 to include an actuation system 20 comprising two support members 52. In such embodiments, each of the support members 52 will include distal ends attached to a side edge of the display member 18. Furthermore, such embodiments may provide for two motors 60 to be associated with the two support members 52, such that each motor 60 may control a single support member 52. As previously described, the motors 60 and the support members 52 may be housed within the base 14. As illustrated in the drawings, the motors 60 and the support members 62 may be housed within the base 14 on either side of the display member 18 in a stowed position.

Remaining with FIG. 8-9, the actuator system 20 illustrates use of the linear actuators 50 with threaded shafts 64. As such, the distal ends of the support members 52 may be connected to the side edges of display member 18 via brackets, nut and bolts, or the like. In some embodiments, as illustrated in FIG. 9, each of the support members 52 is connected to the display member 18 at a position spaced apart from the bottom edge 44 of the display member 18 by at least 4 inches, 8 inches, or 12 inches, or alternatively, spaced apart from the top edge 46 of the display member 18 by at least 4 inches, 8 inches, or 12 inches.

When the display member 18 is in the stowed position (e.g., FIG. 8), the support member 52 is in a retracted position, with its proximal end positioned adjacent to the proximal end of the threaded shaft 64 (i.e., closer to the motor 60). To shift the display member 18 to the deployed position (e.g., FIG. 9), the motor 60 is caused to rotate, causing a corresponding rotation of the threaded shaft 64, thus causing the threaded component 66 and the proximal end of the support member 52 to translate away from the motor 60. Such a translation pushes the display member 18 up from its stowed position to its deployed position. A reverse process is followed to shift the display member 18 from its deployed position to its stowed position.

As previously described with respect to embodiments with a single linear actuator 50 and a single support member 52, while in the stowed position, certain embodiments provide for the display member 18 to be generally parallel with the bottom plate 30 of the base 14 and with the roof 16 of the emergency vehicle 12. While in the deployed position, certain embodiments provide for the display member 18 to be generally perpendicular with the bottom plate 30 of the base 14 and with the roof 16 of the emergency vehicle 12. However, in other embodiments, the display member 18 may be orientated at different angles. For example, in some embodiments, the orientation of the display member 18 in the deployed position may be at least 60, 75, or 85 degrees and/or not more than 120, 105, or 95 degrees different than the orientation of the display member 18 in the stowed position.

Correspondingly, as illustrated in FIG. 8, while in the stowed position, certain embodiments provide for the support members 52 to be retracted and generally parallel with the display member 18. In some embodiments, the support members 52 will be generally coplanar with the display member 18 when the display member 18 is in the stowed position. Alternatively, in the deployed position, as shown in FIG. 9, certain embodiments provide for the support member 52 to be extended and angled relative to the display member 18. In such embodiments, each of the support members 52 may form an angle of extension with respect to the display member 18 that is at least 15, 30, or 40 degrees and/or not more than 75, 60, or 50 degrees. As such, and with respect to the embodiment illustrated in FIGS. 8-9 with dual support members 52, while the support members 52 are in an extended position (i.e., their proximal ends away from their respective motors 60), the display member 18 is in the deployed position, and while the support members 58 are in a retracted position (i.e., their proximal ends closer to their respective motors 60), the display member 18 is in the deployed position.

In certain embodiments, the traffic advisor 10 will further comprise an electrical control system (not shown) operable to control at least the position of the display member 18 (i.e., via the actuation system 20) and/or the advisory messages presented via the display member 18. The control system may comprise an onboard vehicle computer that is operably connected to an electrical system of the emergency vehicle 12 and configured provide instructions to the traffic advisor 10. In some embodiments, the electronic control system additionally comprises one or more input devices for receiving operator inputs concerning the position and/or advisory message of said display member. In certain embodiments, the input devices may be part of the emergency vehicle 12, such as a button, switch, or touchscreen installed within a dashboard of the emergency vehicle 12. In other embodiments, the input devices may be include a mobile computing device, such as a smartphone, tablet, laptop computer, or the like, such as is described in U.S. patent application Ser. No. 14/158,901, filed on Jan. 20, 2014, and entitled "EMERGENCY VEHICLE CONTROL APPLICATION," the entirety of which is incorporated by reference herein.

Figure 10:
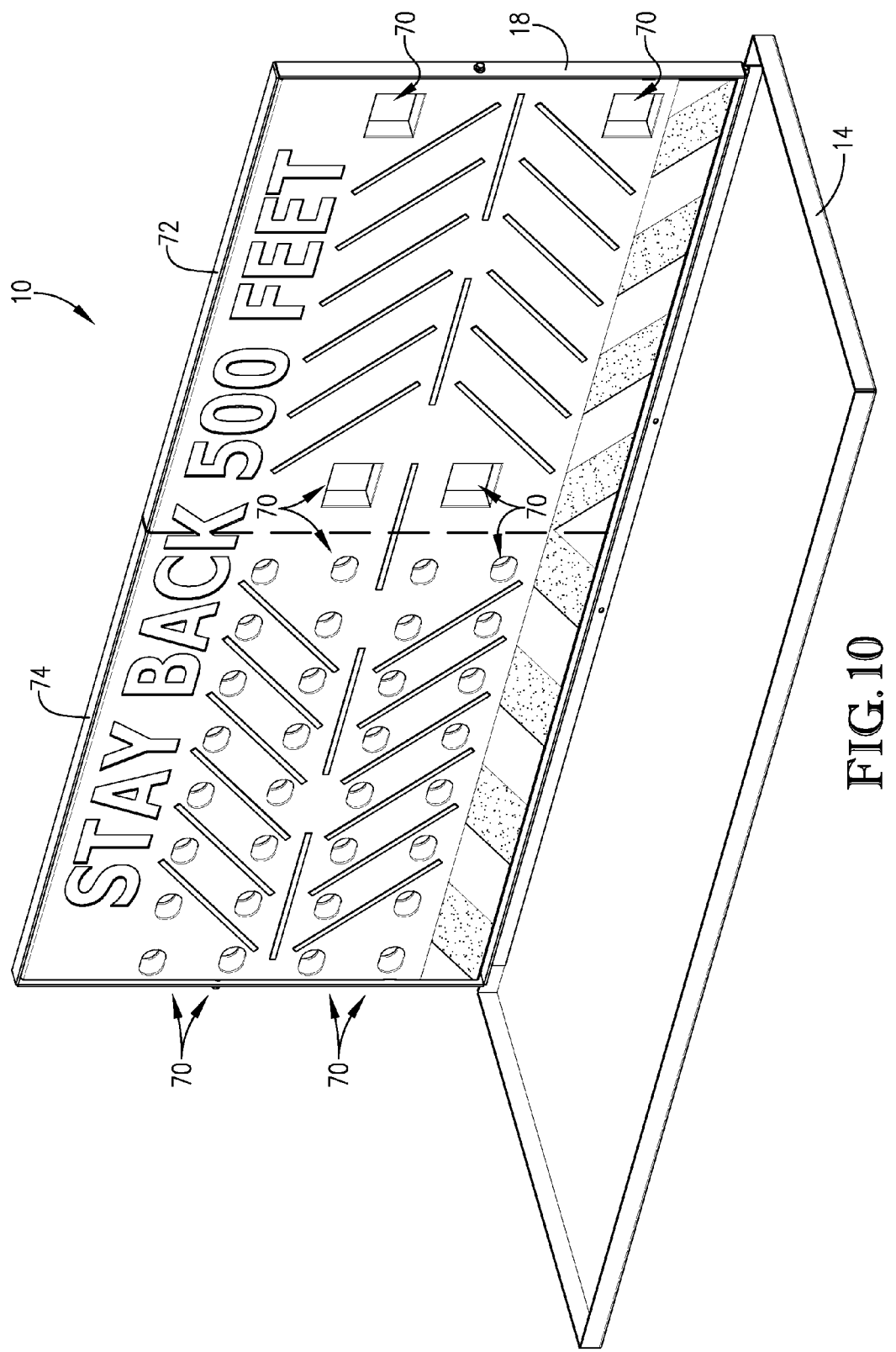
FIG. 10 is a perspective view of a further embodiment of a traffic advisor, with the traffic advisor in a deployed position.
Figure 11:
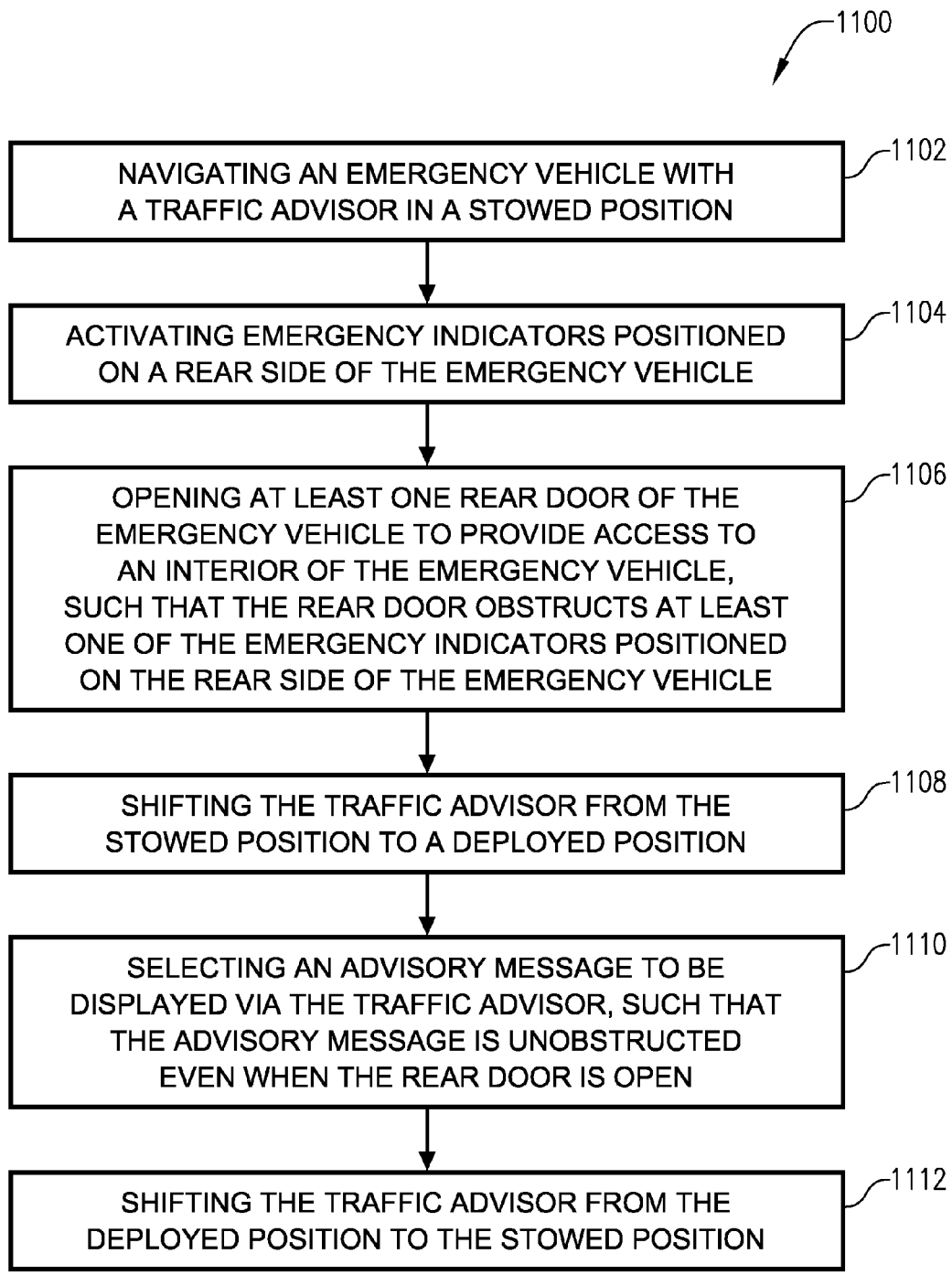
FIG. 11 is a flow chart of a method for operating an emergency vehicle according to embodiments of the present invention.

As such, the electrical control system can be used to control whether the display member 18 is in the stowed or deployed configuration. For example, in normal driving conditions, the display member 18 may be in the stowed position, so as to avoid aerodynamic drag forces that may impinge on the display member 18. Nevertheless, in certain embodiments, the display member 18 may include a one or more openings, in the form of "flow-throughs," extending through the thickness of the display member 18. Such "flow-throughs" may provide for ambient air to flow through the display member 18 while the emergency vehicle 12 is motion. As such, the display member 18 may be operable to be in the deployed position while the emergency vehicle is in motion. As illustrated in FIG. 10, the "flow-throughs" 70 may be formed as a plurality of circular, square, or various other shaped holes. The "flow-throughs" 70 may be formed in various sizes. Furthermore, in certain embodiments, the display member 18 may be formed from a grate-like material that is dense enough to hold the illumination system, while porous enough to allow for ambient air to flow through the display member 18.

Returning to embodiments in which the display member 18 is held in the stowed position while the emergency vehicle 12 is in motion, when the emergency vehicle arrives at a destination (e.g., a location of an emergency event), a user (e.g., an ambulance operator/driver) can use the input device to instruct the control system to raise the display member 18 from the stowed position to the deployed position. In additional embodiments, the control system may automatically cause the display member 18 to be raised from the stowed position to the deployed position if certain criterion is met. For example, the control system may be linked with a transmission or a transmission control of the emergency vehicle 12, such that when the emergency vehicle's transmission is placed in a "Park" position, the display member 18 is caused to be automatically raised to the deployed position. Alternatively, when the vehicle's transmission is shifted from the "Park" to the "Drive" position, the display member 18 may be caused to be lowered from the deployed position to the stowed position. In further embodiments, the display member 18 may be automatically shifted from the stowed to the deployed position when the emergency vehicle's main emergency indicators 26 (e.g., lights and sirens) are activated. As previously mentioned, the traffic advisor 10 allows for advisory messages to be displayed even when the emergency vehicle's 12 main emergency indicators 26 (e.g., lights and sirens) are blocked by the rear doors 28 being in an open position. As such, embodiments may provide for the display member 18 to be automatically shifted from the stowed position to the deployed position when one or more of the rear doors 28 of the emergency vehicle 12 are opened. In further embodiments, the display member 18 may be shifted when a combination of criteria is meet, such as when: (1) the emergency vehicle's 12 transmission is placed in the "Park" and the emergency vehicle's main emergency indicators (e.g., lights and sirens) are activated, or (2) the emergency vehicle's 12 rear doors 28 are opened and the emergency vehicle's 12 main emergency indicators 26 (e.g., lights and sirens) are activated.

Furthermore, the electronic control system may comprise at least one sensor for sensing whether the actuating system 20 and/or the display member 18 are functioning properly. Specifically, the sensor may include a position sensor operable to determine a position of the display member 18 or, alternatively, a position of the support member 52. If the position sensor indicates that the display member 18 and/or the support member 52 are not in a correct position (e.g., a stowed position or a deployed position), the electronic control system may indicate an alert. Such an alert may be indicated via a warning indicator that is included and/or otherwise associated with the control system. For example, the warning indicator may be a light indicator integrated on the dashboard of the emergency vehicle 12. Alternatively, or in addition, the warning indicator may be included as part of the input device of the control system.

The electronic control system is also configured to control the advisory messages that are displayed via the illumination system included on the rearward-facing side 42 of the display member 18. In some embodiments the electronic control system may include a flash sequencer comprising a controller and one or more solid state relays (SSRs) that are integrated within the traffic advisor 10. In other embodiments, the flash sequencer may be integrated within the electrical system of the emergency vehicle 12. In still further embodiments, the electronic control system may control the advisory messages via other electronic control devices, such as a microcontroller, a microprocessor, or some combination of hardware, software, and/or firmware. Nevertheless, in certain embodiments, the electronic control system is operable to obtain instructions from a user, such as via the input device, and providing such instructions to the display member 18 so as to display a specific advisory message. In other embodiments, the electronic control system will automatically display one or more specific pre-determined and/or default advisory messages.

The number and type of advisory messages capable of being displayed via the display device 18 may be dependent on the number and type of lights associated with the illumination system of the display device 18. In some embodiments, as illustrated in the FIGS. 3, 5, 9, and 10, the display device 18 will include 29 LED-type lights that are capable of displaying, at least, a "Left Turn," a "Right Turn," or a "Center Out" advisory message. In more detail, the display device 18 may include 5 horizontal lights extending generally across a center of the rearward-facing side of the display member 18, with such horizontal lights including a center horizontal light, left and right intermediate horizontal lights opposing the center horizontal light, and first and second exterior horizontal lights opposing the center horizontal light and the first and second intermediate horizontal lights.

Furthermore, the display member may include a plurality of angled light pairs that are each orientated so as to present an arrow. With reference to FIG. 10, the display member 18 may include six spaced apart light pairs on a right half 72 of the display member, with each light in each light pair angled to present an arrow that points to a position right of the traffic advisor 10 and the emergency vehicle 12. As such, the light pairs on the right half 72 of the display member 18 include a left-most light pair (adjacent to a center of the display member 18) and a right-most light pair (adjacent to a right edge of the display member 18) separated by four, spaced apart intermediate light pairs. Similarly, the display member 18 may include six spaced apart light pairs on a left half 74 of the display member 18, with each light pair forming an arrow that points to a position left of the traffic advisor 10 and the emergency vehicle 12. As such, the light pairs on the left half 74 of the display member 18 include a right-most light pair (adjacent to the center of the display member 18) and a left-most light pair (adjacent to a left edge of the display member 18) separated by four, spaced apart intermediate light pairs.

In view of the description of the illumination system of the display member 18 provided above, the control system of embodiments provides for the display member 18 to display a plurality of advisory messages. For example, the display member 18 can display a "Right Turn" advisory message that instructs an observer of the display member 18 to turn right. For the "Right Turn" advisory message the right exterior and intermediate horizontal lights on the right half 72 of the display member 18 will be activated, as well as the light pairs on the right half 72 of the display member 18. As such, and with the lights on the right half 72 of the display member 18 activated, the lights will present a plurality of right-pointing arrows indicative of an advisory message instructing observers to turn right. In certain embodiments, the control system will instruct the lights on the right half 72 of the display member 18 to remain constantly active. In other embodiments, the control system will instruct the lights to flash/blink on and off. In still further embodiments, the lights will activate sequentially from the center of the display member 18 to the right edge of the display member 18 to further emphasize the advisory message of turning right. For example, to begin, the right intermediate horizontal light and the left-most light pair will each be activated for a period of time. Subsequently, adjacent light pairs on the right half 72 of the display member 18 will be momentarily activated (from the left-most light pair to the right-most light pair), with each being activated for the period of time, until the right exterior horizontal light and the right-most light pair are activated. As such, the lights on the right half 72 of the display member 18 are able to present an advisory message in the form of a "right turn animation" that graphically advises an observer to turn right. In some embodiments, the right intermediate horizontal light, the left-most light pair, and adjacent light pairs on the right half 72 of the display member 18 may each remain active until the right-most light pair has been activated. In such embodiments, the "right turn animation" will begin with a status of no lights activated on the right half 72 of the display device 18 to a status of all of the lights on the right half 72 of the display device 18 being active.

Similarly, the display member 18 can display a "Left Turn" advisory message that instructs an observer to turn left. For the "Left Turn" advisory message the left exterior and intermediate horizontal lights on the left half 74 of the display member 18 will be activated, as well as the light pairs on the left half 74 of the display member 18. As such, with the lights on the left half 74 of the display member 18 activated, the lights will present a plurality of left-pointing arrows indicative of an advisory message instructing observers of the display member 18 to turn left. In certain embodiments, the control system will instruct the lights on the left half 74 of the display member 18 to remain constantly active. In other embodiments, the control system will instruct the lights to flash/blink on and off. In still further embodiments, the lights will activate sequentially from the center of the display member 18 to the left edge of the display member 18, so as to further emphasize the advisory message of turning left. For example, to begin, the left intermediate horizontal light and the right-most light pair will each be activated for a period of time. Subsequently, adjacent light pairs on the left half 74 of the display member 18 will momentarily be activated (from the right-most light pair to the left-most light pair), with each being activated for the period of time, until the left exterior horizontal light and the left-most light pair are activated. As such, the lights on the left half 74 of the display member 18 are able to present an advisory message in the form of a "left turn animation" that graphically advises an observer to turn left. In some embodiments, the left intermediate horizontal light, the right-most light pair, and adjacent light pairs on the left half 74 of the display member 18 may each remain active until the left-most light pair has been activated. In such embodiments, the "left turn animation" will begin with a status of no lights on the left half 74 of the display device 18 being active to a status of all of the lights on the left side 74 of the display device being active.

Embodiments of the present invention further provide for the display member 18 to present other types of non-turn advisory messages. For example, the display member 18 may present a "center out animation." The "center out animation" advisory message generally comprises the "right turn animation" and the "left turn animation" executing simultaneously. Specifically, the "center animation" begins with the center horizontal light being active for a period of time, followed by the simultaneous execution of the "left turn animation" and the "right turn animation." Such a "center out animation" may repeat continuously so as to provide an alert-type advisory message that advises observes to use caution and/or that a hazard is ahead. In certain embodiments, the "center out animation" may be an automated and/or default advisory message, such that if a user does not select a specific advisory message or if a predetermined criteria of the emergency vehicle 12 is met, then the "center out animation" advisory message is displayed.

Given the description provided above, embodiments of the present invention include a method 1100 for operating an emergency vehicle 12 having a traffic advisor 10 operable to display one or more advisory messages, with the traffic advisor being positioned on a roof 16 of the emergency vehicle 12. The method 1100 may include the initial Step 1102 of navigating the emergency vehicle 12, with the traffic advisor 10 being in a stowed position. A next Step 1104 includes, activating emergency indicators 26 positioned on a rear side of the emergency vehicle 12. A next Step 1106 includes, opening at least one rear door 28 of the emergency vehicle 12 to provide access to an interior of the emergency vehicle 12. When the rear door 28 is open, the rear door 28 may obstruct at least one of the emergency indicators 26 positioned on the rear side of the emergency vehicle 12. A next Step 1108 includes, shifting the traffic advisor 10 from the stowed position to a deployed position. After shifting the traffic advisor, a next Step 1110 includes selecting an advisory message to be displayed via the traffic advisor 10. As such, the advisory message is unobstructed even when said rear door 28 is open. A final Step 1112 includes shifting the traffic advisor 10 from the deployed position to the stowed position. Thus, embodiments of the present invention provide a method for operating an emergency vehicle 12 that includes that ability to display an advisory message from the vehicle 12, even while the vehicle's 12 main emergency indicators 26 are obstructed.

In some embodiments, the traffic advisor 10 will include one or more securing mechanisms (not shown) operable to secure the display member 18 in the stowed position. In some embodiments, the securing mechanisms may include a locking component associated with the actuator system 20. Such a locking component may include a mechanical or magnetic brake or a stop that restricts the motor 60 from turning, thereby restricting the display member 18 from being shifting from the stowed position to the deployed position. In some embodiments, such a locking component may be automatically controlled by the control system, such that when the control system instructs the actuator system 20 to shift the display member 18 from the stowed to deployed position, the control system causes the locking component to release the motor 60.

Additional embodiments provide for the securing mechanism to include a mechanical locking component associated with the base 14 and the display member 18. Such a locking component may comprise a latch operable to secure the display member to the base 14 in the stowed position. In such a configuration, the locking component may be manually activated, such that a user must manually secure/unsecure the latch. In other instances, such a latch may be associated with an actuator 20, such that the actuator 20 can automatically secure/unsecure the latch. In still other embodiments, the locking component may include other forms of automatically actuated securing mechanisms. For example, the locking component may include magnetic locking components associated with each of the base 14 and the display member 18, with the magnetic locking components operable to selectively secure, via the control system, the display member 18 in place in the stowed position.

Although the invention has been described with reference to the preferred embodiment(s), it is noted that equivalents may be employed and substitutions made herein without departing from the scope of the invention. Thus, the invention described herein is entitled to those equivalents and substitutions that perform substantially the same function in substantially the same way.

Having thus described various embodiments of the invention, what is claimed as new and desired to be protected by Letters Patent includes the following:

1. A traffic advisor for an emergency vehicle, wherein the emergency vehicle includes emergency indicators and at least one rear door, said traffic advisor comprising:

a base configured for attachment to a roof of said emergency vehicle, wherein said base includes a bottom plate with top and bottom surfaces and a rim extending up from said top surface and extending around a circumference of the top surface;

a display member coupled to said base and shiftable relative to said base between a stowed position and a deployed position, wherein said display member is configured to display one or more advisory messages;

an actuation system for shifting said display member between said stowed position and said deployed position, wherein, in said deployed position, said display member presents a forward-facing side and a rearward-facing side, wherein said actuation system comprises at least one linear actuator and at least one elongated support member extending from said linear actuator to the forward-facing side of said display member, wherein said support members is operable to support said display member in said deployed position, and wherein in the stowed position, said support member is generally parallel with said display member, wherein said display member has a thickness that corresponds to a height of said rim of said base, such that, in the stowed position, said rearward-facing side of said display member is positioned adjacent to said bottom plate of said base and said forward-facing side is substantially flush with a top portion of said rim of said base; and an electronic control system operable to control the position of said display member, wherein said electronic control system is configured to maintain said display member in the stowed position when only the emergency indicators are activated, and wherein said electronic control system is configured to automatically shift said display member from the stowed position to the deployed position when the emergency indicators are activated and the at least one rear door is opened.

2. The traffic advisor of claim 1, wherein no portion of said traffic advisor extends more than 3 inches above said roof of said emergency vehicle when said display member is in said stowed position.

3. The traffic advisor of claim 1, wherein at least a portion of said display member extends at least 24 inches above said roof of said emergency vehicle when said display member is in the deployed position.

4. The traffic advisor of claim 1, wherein said actuation system comprises an actuator housing for at least partly enclosing said actuator, wherein said actuator housing is positioned forward of said base.

5. The traffic advisor of claim 1, wherein said display member has a bottom edge and a top edge, and wherein a first end of said support member is secured to the forward-facing side of said display member at an attachment location spaced at least 8 inches from said bottom edge.

6. The traffic advisor of claim 1, wherein said housing includes an elongated slot through which said support member travels when said display member is shifted between said stowed and deployed positions.

7. The traffic advisor of claim 1, wherein the rearward-facing side of said display member comprises an illumination system for displaying said one or more advisory messages, wherein said advisory messages comprise advisory text or symbols.

8. The traffic advisor of claim 1, wherein the electronic control system is operable to control the advisory message of said display member.

9. The traffic advisor of claim 8, wherein said electronic control system comprises one or more input devices for receiving operator inputs for instructing the control system to control at least one of the position and the advisory message of said display member.

10. The traffic advisor of claim 8, wherein said electronic control system comprises at least one electronic sensor for sensing whether said display member is functioning properly, and wherein said electronic control system comprises at least one warning indicator for indicating when said electronic sensor senses that said display system is not functioning properly.

11. An emergency vehicle comprising:
   a cab;
   emergency indicators;
   a patient compartment comprising a roof and one or more rear access doors positioned on a rear side of said patient compartment;
   a traffic advisor comprising a display member coupled to said roof and shiftable between a stowed position where the display member is substantially parallel to said roof and a deployed position where said display member extends upwardly from said roof,
   wherein said traffic advisor further comprises an actuation system positioned forward of said display member for shifting said display member between said stowed position and said deployed position, wherein said actuation system comprises an actuator and an elongated support member extending from said actuator and coupled with a forward-facing side of the display member,
   wherein said display member is spaced less than 12 inches forward of said rear side of said patient compartment, such that a substantial portion of said display member is visible from a position immediately rearward of said emergency vehicle;
   a control system operable to control the position of said display member, wherein said control system is configured to maintain said display member in the stowed position when only said emergency indicators are activated, and wherein said control system is configured to automatically shift said display member from the stowed position to the deployed position when said emergency indicators are activated and said one or more rear access doors are opened.

12. The emergency vehicle of claim 11, wherein a ratio of a length of the traffic advisor to a width of the patient compartment is at least 2:3.

13. The emergency vehicle of claim 11, wherein the display member includes an illumination system for displaying one or more advisory messages comprising advisory text or symbols.

14. The emergency vehicle of claim 13, wherein said control system is configured to control the one or more advisory messages displayed via the illumination system of the display member.

15. The emergency vehicle of claim 14, wherein the control system includes an input device for receiving instructions from a user to select at least one of the one or more advisory messages displayed via the illumination system of the display member.

16. The emergency vehicle of claim 11, wherein the display member includes one or more pass through openings formed through a thickness of said display member, such that ambient air is operable to flow through said openings when said display member is in the deployed position and when the emergency vehicle is in motion.

17. A method for operating an emergency vehicle having a traffic advisor that displays one or more advisory messages, with the traffic advisor being positioned on a roof of the emergency vehicle, wherein the method comprises the following steps:
   navigating said emergency vehicle, wherein during said navigating step, said traffic advisor is in a stowed position;
   activating emergency indicators positioned on a rear side of said emergency vehicle,
   wherein upon activating said emergency indicators, said traffic advisor remains in the stowed position;
   opening at least one rear door of said emergency vehicle to provide access to an interior of said emergency vehicle, wherein when said rear door is open, said rear door obstructs at least one of the emergency indicators position on the rear side of the emergency vehicle;
   shifting said traffic advisor from the stowed position to a deployed position,
   wherein said shifting of said traffic advisor from the stowed position to the deployed position is performed automatically based on said emergency indicators being activated and said at least one rear door being opened;
   selecting an advisory message to be displayed via said traffic advisor, wherein said advisory message is unobstructed even when said rear door is open; and
   shifting said traffic advisor from the deployed position to the stowed position.

18. The method of claim 17, wherein said advisory message selected to be displayed is a first advisory message, and wherein the method further includes the step of selecting a second advisory message to be displayed via said traffic advisor.

\* \* \* \* \*